United States Patent
Sorensen et al.

(10) Patent No.: US 10,710,294 B1
(45) Date of Patent: Jul. 14, 2020

(54) SCREEN PROTECTOR INSTALLATION MACHINE

(71) Applicant: ZAGG Intellectual Property Holding, Co., Inc., Midvale, UT (US)

(72) Inventors: Kyle Sorensen, Springville, UT (US); John Ruess, Midvale, UT (US); Dan Oakeson, West Jordan, UT (US); Cecily Sabin, Draper, UT (US); Manuel Carreon, Lehi, UT (US); Jordan Melville, Sandy, UT (US)

(73) Assignee: ZAGG Intellectual Property Holding, Co., Inc., Midvale, UT (US)

( * ) Notice: Subject to any disclaimer, the term of this patent is extended or adjusted under 35 U.S.C. 154(b) by 79 days.

(21) Appl. No.: 16/225,836

(22) Filed: Dec. 19, 2018

(51) Int. Cl.
| | | |
|---|---|---|
| *B29C 63/02* | (2006.01) | |
| *B29C 63/00* | (2006.01) | |
| *B32B 37/00* | (2006.01) | |
| *B29L 31/34* | (2006.01) | |
| *B32B 7/12* | (2006.01) | |

(52) U.S. Cl.
CPC .......... *B29C 63/02* (2013.01); *B29C 63/0004* (2013.01); *B32B 37/0053* (2013.01); *B29L 2031/3437* (2013.01); *B32B 7/12* (2013.01); *B32B 2457/208* (2013.01)

(58) Field of Classification Search
None
See application file for complete search history.

(56) References Cited

U.S. PATENT DOCUMENTS

| | | | |
|---|---|---|---|
| 8,393,377 B2 * | 3/2013 | Patel | B29C 63/02 156/538 |
| 8,905,107 B2 | 12/2014 | Patel et al. | |
| 9,010,396 B2 | 4/2015 | Patel et al. | |
| 9,033,019 B2 * | 5/2015 | Patel | H04M 1/0266 156/528 |
| 9,089,085 B2 | 7/2015 | Patel et al. | |
| 9,662,860 B2 | 5/2017 | Wadsworth | |
| 9,701,062 B2 | 7/2017 | Wadsworth et al. | |
| 9,701,096 B2 | 7/2017 | Beaupre | |
| 9,757,934 B2 | 9/2017 | Wadsworth | |
| D800,130 S | 10/2017 | Beaupre et al. | |

(Continued)

FOREIGN PATENT DOCUMENTS

KR 10-1135144 A * 4/2012

*Primary Examiner* — Jeffry H Aftergut
(74) *Attorney, Agent, or Firm* — Thorpe, North & Western, LLP

(57) ABSTRACT

A screen protector installation machine uses a screen protector laminate to apply a screen protector to a cell phone. The laminate comprise a web that carries the screen protector and a backing layer. The laminate is carried by a lid coupled to a base and closable over the base. An impression in the base receives the cell phone. A first slider is carried by the lid and comprises a spool rotatable with respect to the lid. A tab of the backing layer is coupled to the spool. As the slider slides over the cell phone, the spool rotates to wind the backing layer around the spool to expose the screen protector. The lid properly positions and orients the screen protector over the mobile device. The lid is automatically lowered onto the base, and the screen protector is automatically lowered onto the mobile device, by movement of the first slider after the backing layer is removed.

22 Claims, 10 Drawing Sheets

(56) References Cited

U.S. PATENT DOCUMENTS

| | | |
|---|---|---|
| 9,902,111 B2 | 2/2018 | Wadsworth et al. |
| 9,918,418 B2 | 3/2018 | Chou |
| 9,931,823 B2 | 4/2018 | Patel et al. |
| 10,021,818 B2 | 7/2018 | Patel et al. |
| 10,065,365 B2 | 9/2018 | Lane |
| 2012/0211171 A1* | 8/2012 | Patel ............... B29C 63/02 156/538 |
| 2015/0041069 A1* | 2/2015 | Wadsworth ......... B29C 63/0004 156/535 |
| 2015/0047773 A1* | 2/2015 | Wadsworth ......... B32B 38/1833 156/182 |
| 2015/0107767 A1* | 4/2015 | Wadsworth ........... B29C 66/861 156/324 |
| 2015/0230988 A1* | 8/2015 | Chao ............... A61F 9/045 351/159.78 |
| 2015/0246514 A1* | 9/2015 | LaColla ............. B29C 63/0004 156/60 |
| 2015/0314523 A1* | 11/2015 | Mason .................. B29C 63/02 156/247 |
| 2017/0001364 A1* | 1/2017 | MacDonald ............ B29C 63/02 |
| 2017/0253014 A1* | 9/2017 | Kleeman ............... B32B 37/003 |
| 2017/0274635 A1* | 9/2017 | Lin ....................... G06F 1/1637 |

* cited by examiner

SCREEN PROTECTOR INSTALLATION MACHINE

BACKGROUND

Screen protectors are common accessories for cellular phones. Affixing a screen protector can be an exacting and difficult task. It is often necessary to properly align the screen protector with the screen of the cellular phone. The screen protector can have an adhesive layer that can attract and/or trap contaminating particles and/or air bubbles. The improvement of screen protectors in as ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
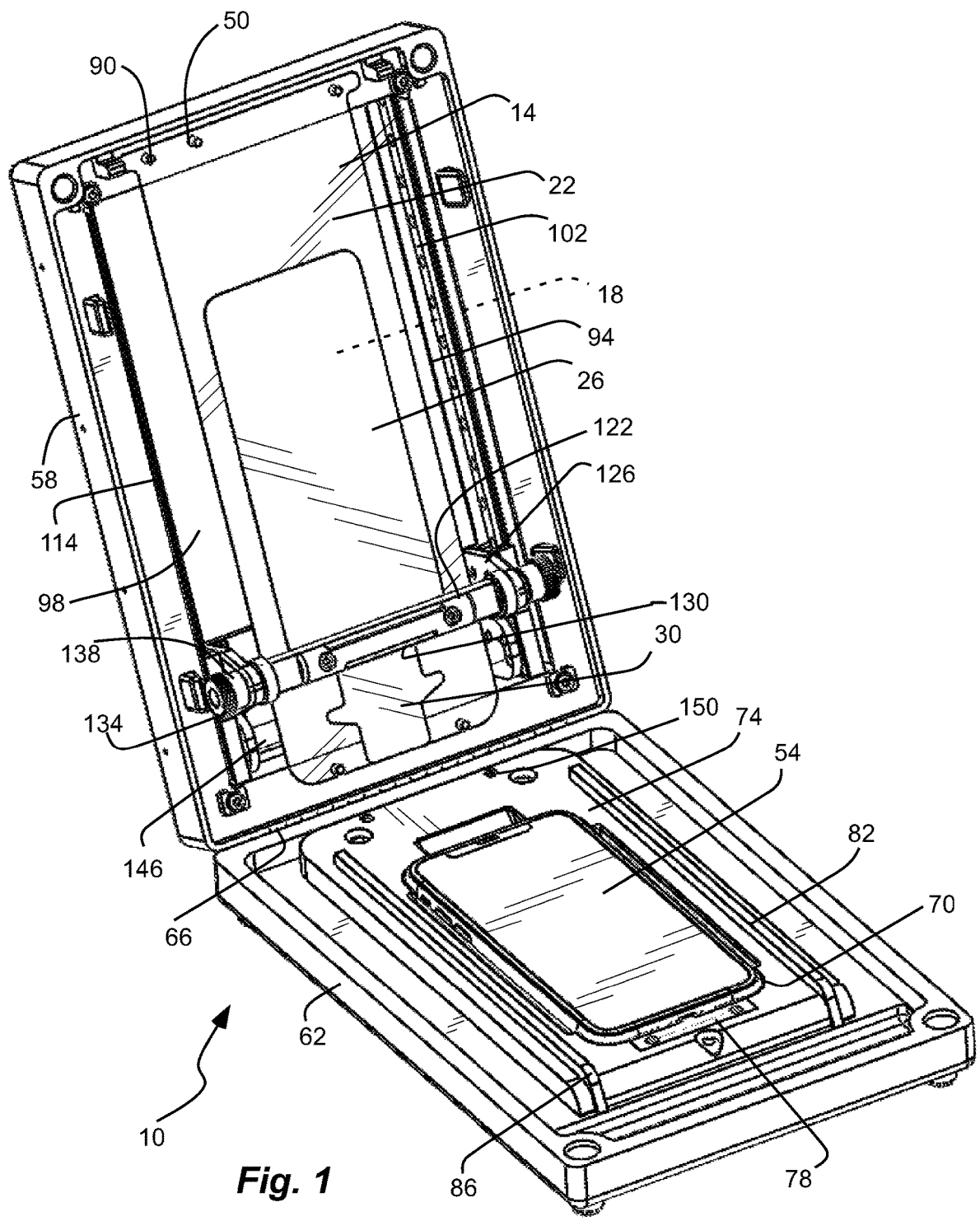
FIG. 1 is a front perspective view of a screen protector installation machine with a screen protector laminate in accordance with an embodiment of the invention, shown in with a lid in an open position and with a mobile device or cellular phone is a base.
Figure 2:
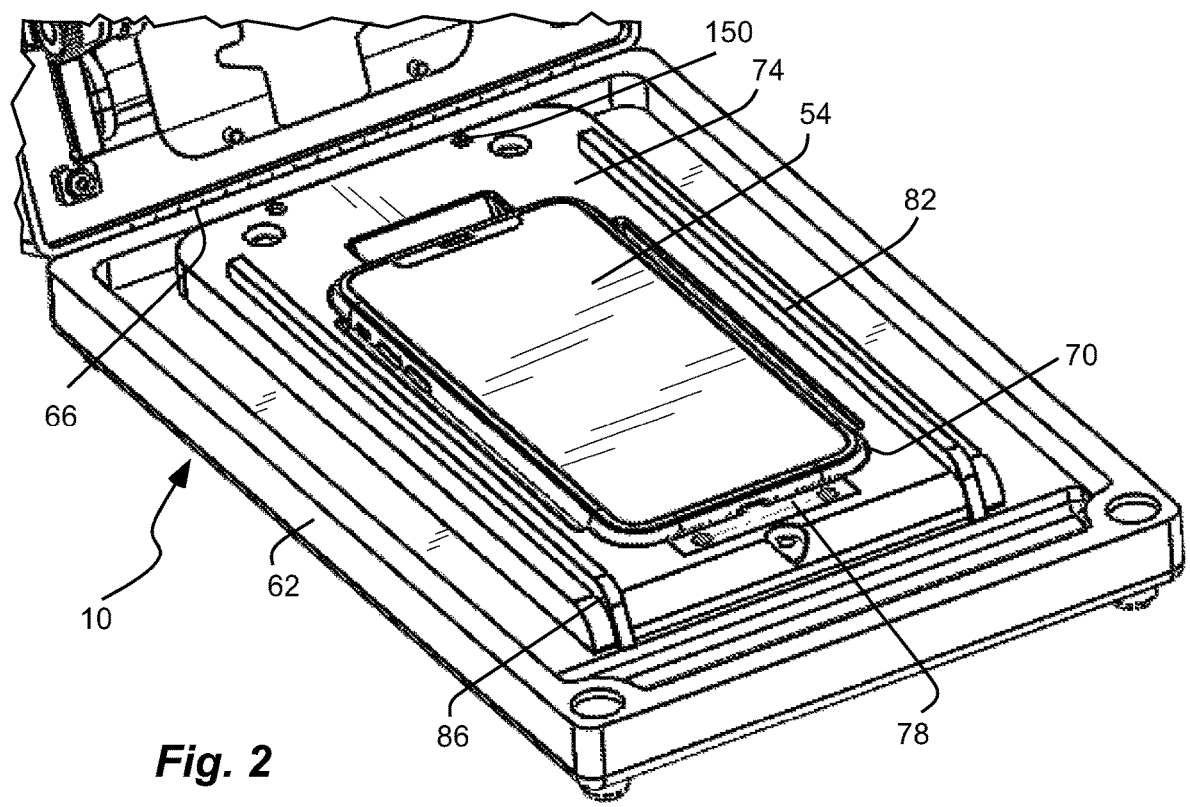
FIG. 2 is a partial, detailed perspective view of the base of the screen protector installation machine of FIG. 1, shown with the mobile device or cellular phone therein.
Figure 3:
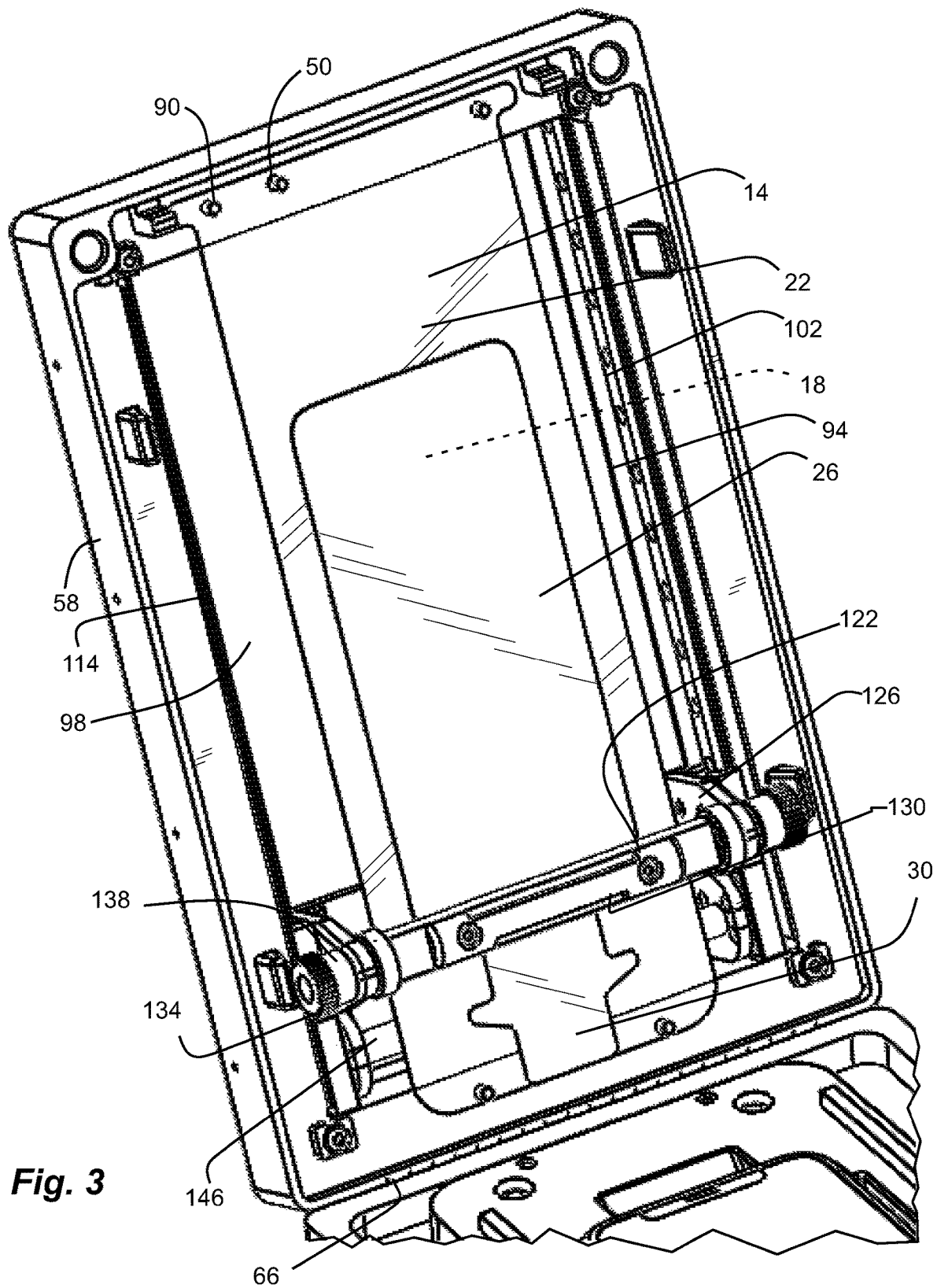
FIG. 3 is a partial, detailed perspective view of the lid of the screen protector installation machine with the screen protector laminate of FIG. 1.
Figure 4:
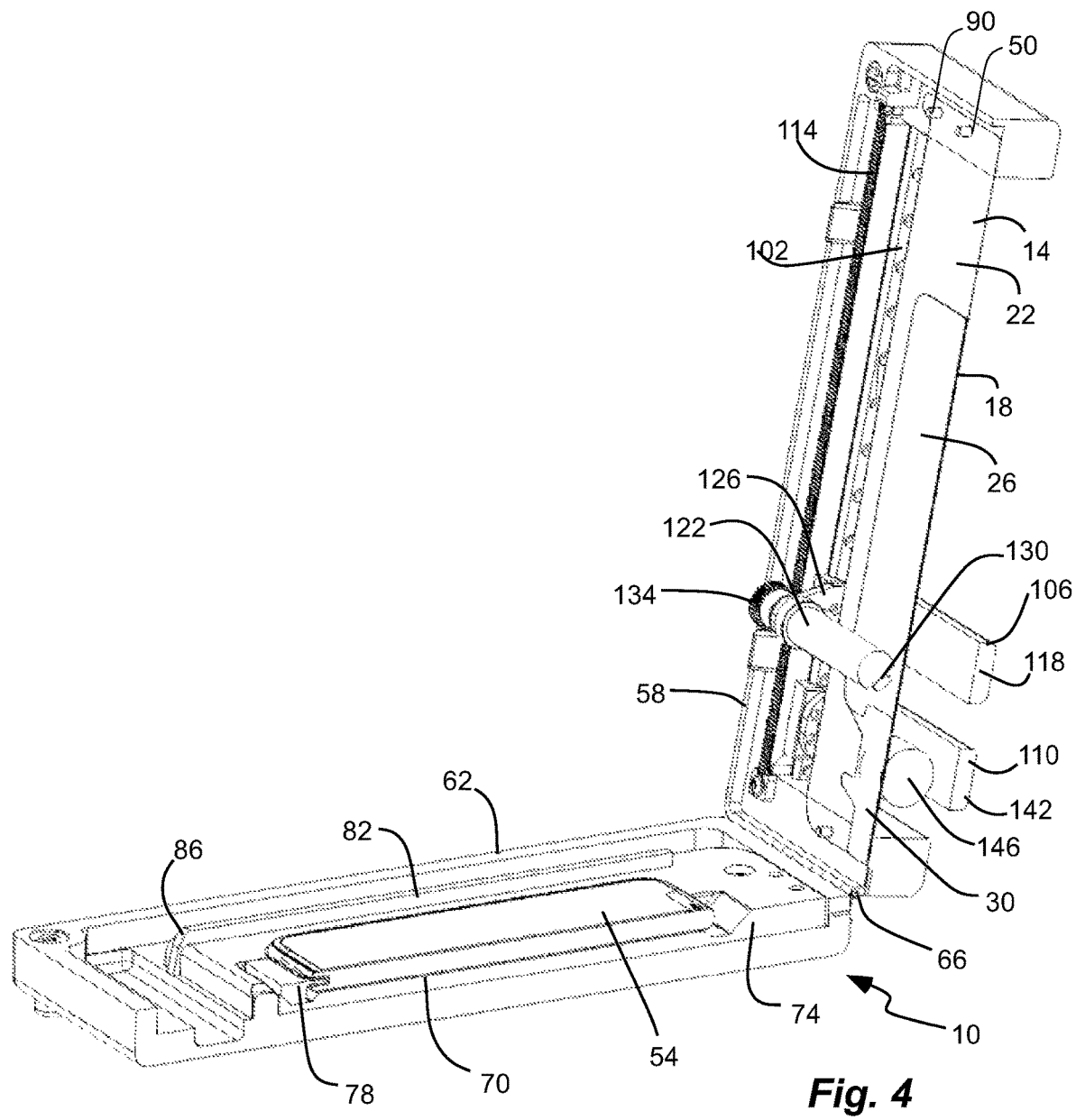
FIG. 4 is a cross-sectional perspective view of the screen protector installation machine with the screen protector laminate of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

The terms "mobile device" and "cell phone" are used interchangeably herein, unless otherwise specified, to refer to a portable handheld electronic device, such as a cellular or cell phone, tablet or tablet computer, phablet, game, and the like, with a display screen, and that is portable and handheld. The display screen can be a touch screen that can receive input by touch such as finger swipes, and/or can have a virtual keyboard. The mobile device can have a battery and memory and a processor with software running thereon. The mobile device can have cellular, WiFi and/or Bluetooth connectivity, and can have a wireless transmitter, receiver, or transceiver. Thus, the mobile device can provide internet browsing, game playing, movie and picture display, e-book display, etc. In addition, the mobile device can include a digital camera. Throughout the description, the term "cell phone" will be used as an example of the mobile device, and such use of the term "cell phone" includes all mobile devices or portable handheld electronic devices, unless otherwise specified.

The term "screen protector" is used herein to refer to a layer or film placed on or over a display screen of the mobile device to provide protection to the display screen. The screen protector can comprise one or more layers, such as a protective glass or plastic layer, an adhesive layer to affix the protective layer to the screen of the mobile device, etc. The screen protector can be transparent such that the display screen can be viewed through the screen protector. In one aspect, the screen protector can be flexible and can comprise a flexible film supported by the screen of the mobile device. In another aspect, the screen protector can be rigid enough to maintain its shape and be self-supporting. In one aspect, the screen protector can be disposed directly on the display screen. In another aspect, the screen protector can be disposed over and above the display screen, with a space or gap therebetween. The screen protector can have a size and shape to substantially match or cover the display screen. In addition, the screen protector can extend beyond the display screen and cover other portions of a user surface of the portable handheld electronic device. The screen protector can have notches or cut-outs in the perimeter thereof, and/or apertures therethrough, to accommodate accessories of the portable handheld electronic device, such as a camera lens, a speaker, a button, etc. In addition, the screen protector can have lateral sides that are curved to match or follow a curvature of the display screen, which can have curved lateral sides extending to lateral edges of the portable handheld electronic device. The outermost lateral edges of the screen protector can contact the display screen to eliminate a gap at the lateral perimeter of the screen protector and the display screen. Thus, the curvature of the lateral edges of the screen protector can have a slightly different curvature than the lateral edges of the display screen.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The invention presents a screen protector installation machine for use with a screen protector laminate to apply a screen protector from the laminate to a mobile device. The laminate can comprise a web or web layer that carries and supports other layers, including the screen protector and a backing layer on the screen protector opposite the web. Thus, the screen protector is sandwiched between the web and the backing layer. The web can be larger than the screen protector and the backing layer such that the screen protector and the backing layer are suspended and circumscribed around a perimeter by the web. The backing layer can cover an adhesive layer of the screen protector until installation.

The machine comprises a lid coupled to a base and closable over the base. In one aspect, the lid can be pivotally coupled to the base. The base comprises an impression to receive and secure the mobile device. In one aspect, the base can receive one of multiple interchangeable blanks each having a different impression or cavity corresponding to a particular mobile device or cellular phone. A first slider is carried by the lid and comprises a spool rotatable with respect to the lid. During use, the laminate is carried by the lid and positioned between the lid and the spool, and the spool is positioned between the laminate and the impression. The web of the laminate is coupled to the lid and a tab of the backing layer is coupled to the spool. As the slider slides over the impression and the mobile device, the spool rotates to wind the backing layer around the spool to expose the screen protector, or the adhesive layer thereof, for installation on the mobile device. In addition to exposing the screen protector, the lid properly positions and orients the screen protector over the mobile device. Furthermore, the lid is automatically lowered onto the base, and the screen protector is automatically lowered onto the mobile device, by movement of the first slider after the backing layer is removed.

Figure 12:
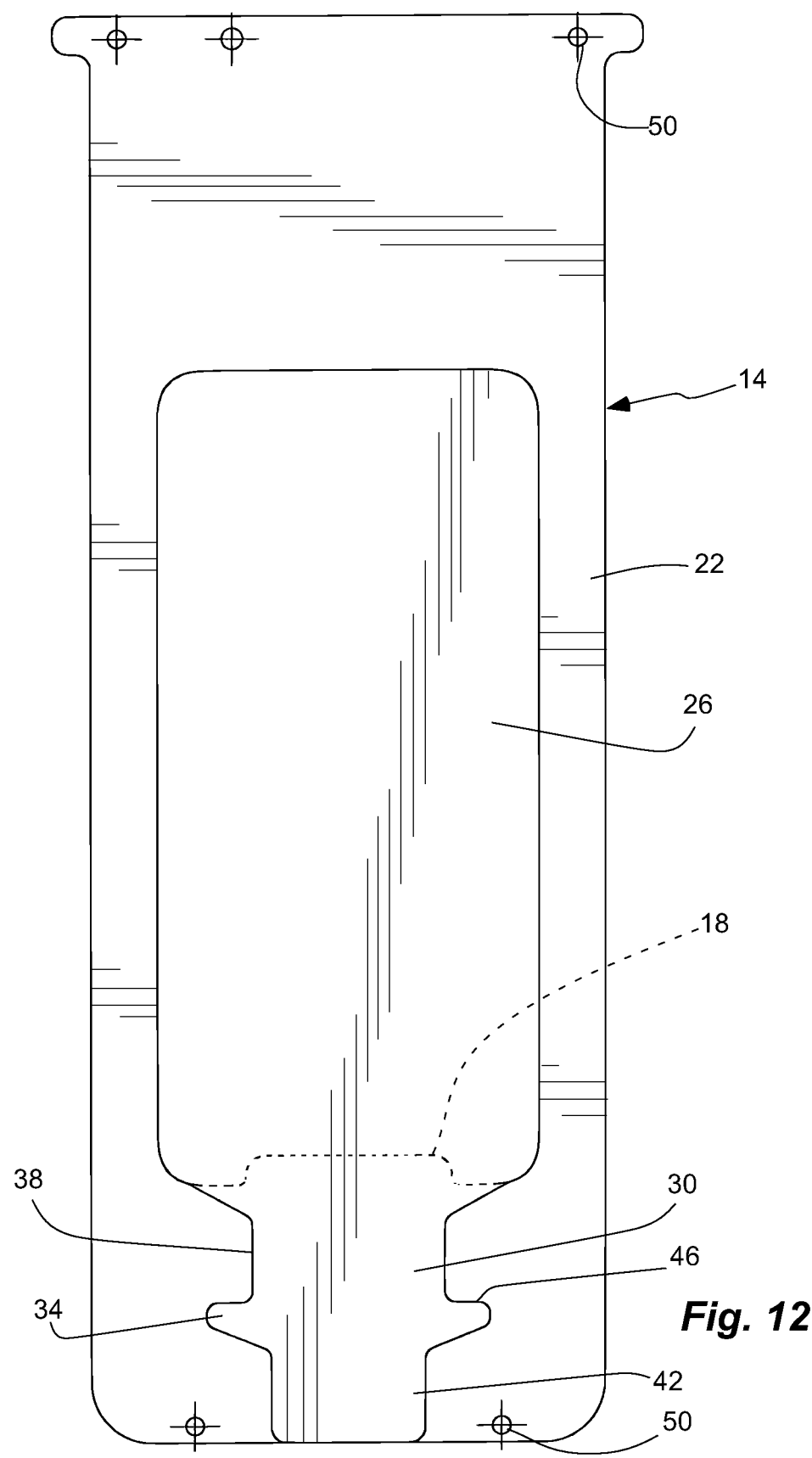
FIG. 12 is a top view of the screen protector laminate of FIG. 1.

Referring to FIG. 12, a screen protector laminate 14 is shown in an exemplary embodiment of the present invention for use with a screen protector installation machine such as machine 10 shown in FIGS. 1-11. The laminate 14 comprises the screen protector 18 carried by a web 22 or web layer. The web 22 can carry all the components of the laminate 14, and can be affixed to and carried by the machine 10. Thus, the web 22 can be sized much larger than the screen protector 18 such that the screen protector 18 is suspended from the web 22 and circumscribed by the web 22 around a perimeter of the screen protector 18. In addition, the laminate comprises a backing layer 26 over the screen protector 18 opposite the web 22. Thus, the screen protector 18 is sandwiched between the web 22 and the backing layer 26. The backing layer 26 can be a release liner that covers and protects an adhesive layer of the screen protector 18 during shipping and handling, and that is removed immediately preceding installation of the screen protector 18 on a display screen of a mobile device or cell phone. The web 22 and the backing layer 26 can be flexible.

The backing layer 26 can cover the entire screen protector 18. In addition, the backing layer 26 can have a tab 30 extending beyond the screen protector 18 and over the web 22. The tab 30 can be used with the machine 10 to remove the backing layer 26 from the screen protector 18, or from the adhesive layer thereof, prior to installation. The tab 30 can have an enlarged head 34 coupled to the backing layer 26, or main portion thereof, by a narrower neck 38. In addition, the enlarged head 34 can have a narrower leading end 42 and a wider trailing end 46 with a wider edge adjacent the narrower neck 38. Furthermore, the tab 30 or enlarged head 34 can tapper from the narrower leading end 42 to the wider trailing end 46. The narrower leading end 42 can form a proximal end of the backing layer 26.

The web 22 can be elongated and can have opposite proximal and distal ends, or leading and trailing ends. Holes 50 can be formed in the web 22 at the proximal and distal ends. The holes 50 can be arranged in a hole pattern that is asymmetrical, or with the hole pattern in the proximal end being different from the hole pattern in the distal end. Thus, the web 22 can have only a single correct orientation during use.

Figure 5:
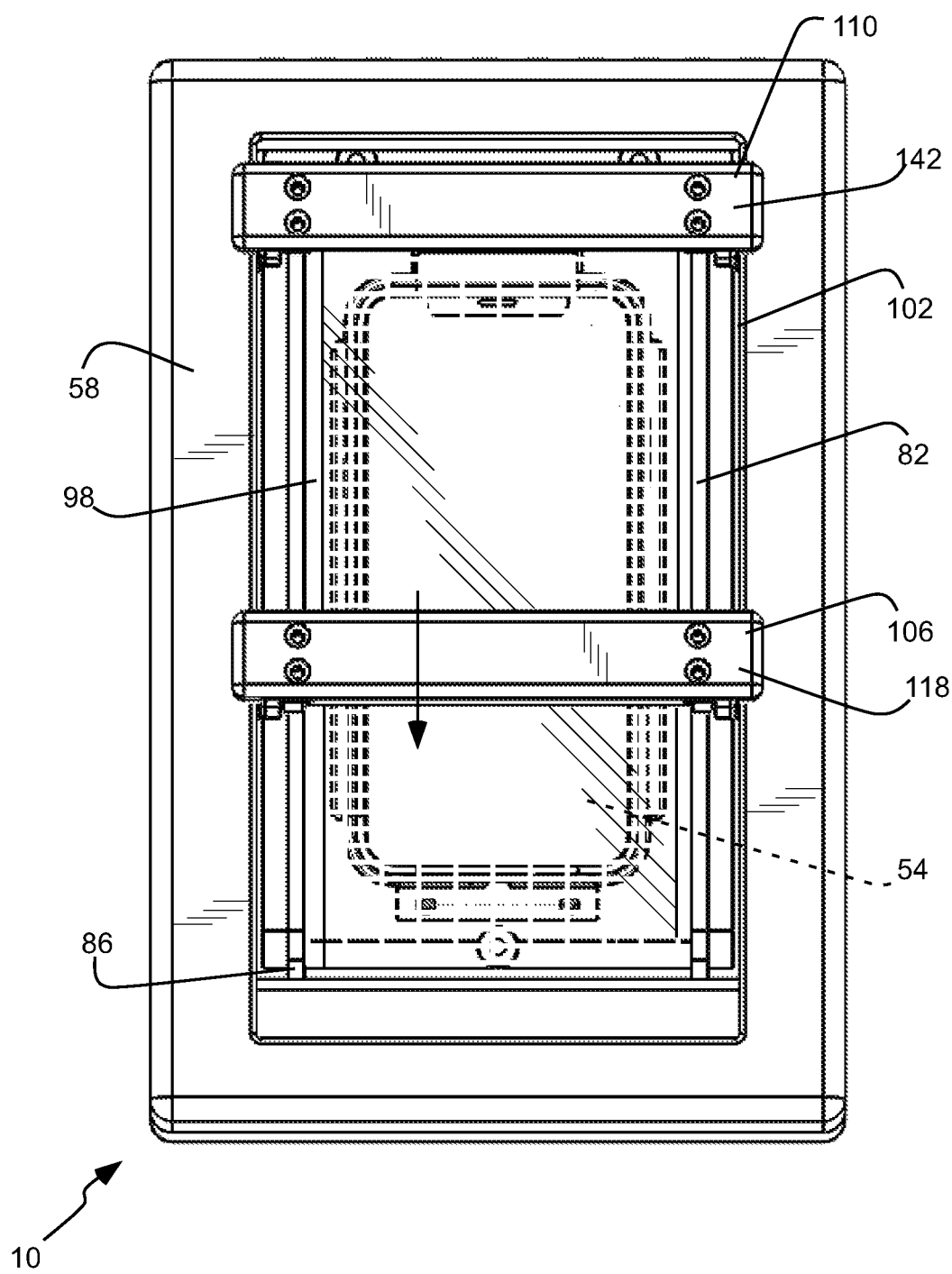
FIG. 5 is a top view of the screen protector installation machine of FIG. 1, shown with the lid in an intermediate position.
Figure 6:
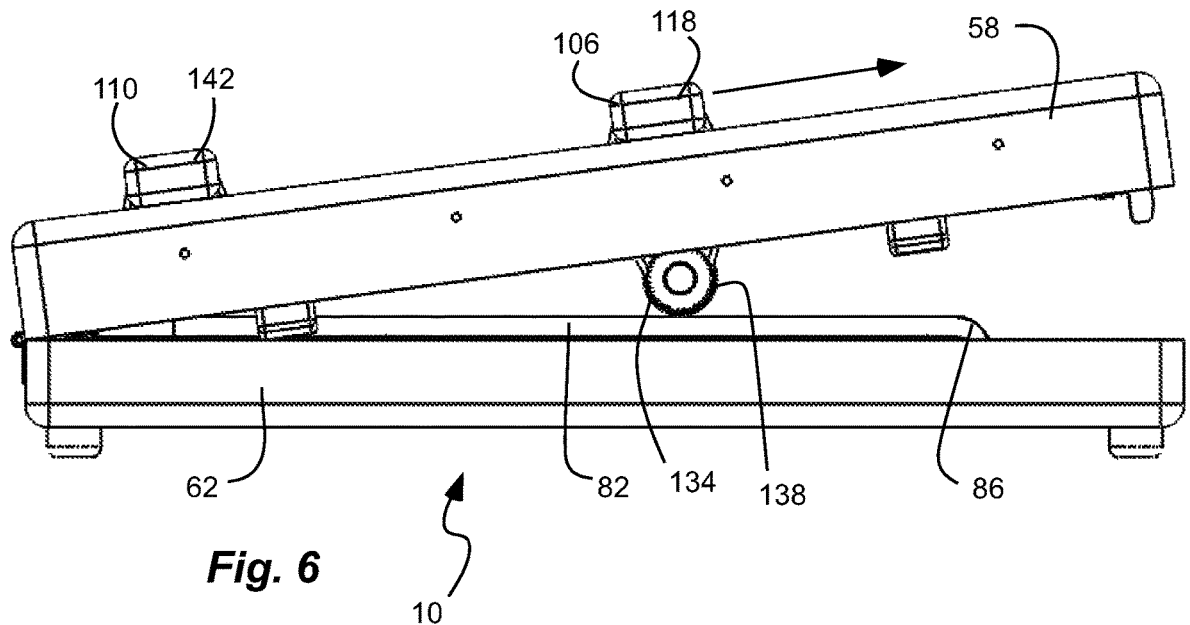
FIG. 6 is a side view of the screen protector installation machine of FIG. 1, shown with the lid in the intermediate position.
Figure 7:
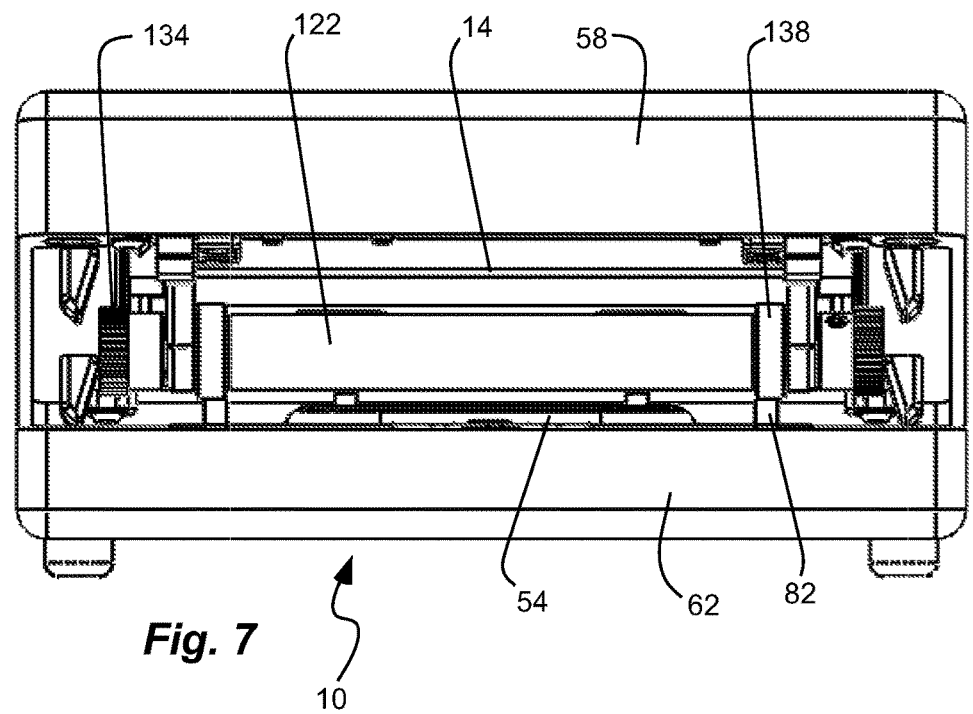
FIG. 7 is a front view of the screen protector installation machine of FIG. 1, shown with the lid in an intermediate position.
Figure 8:
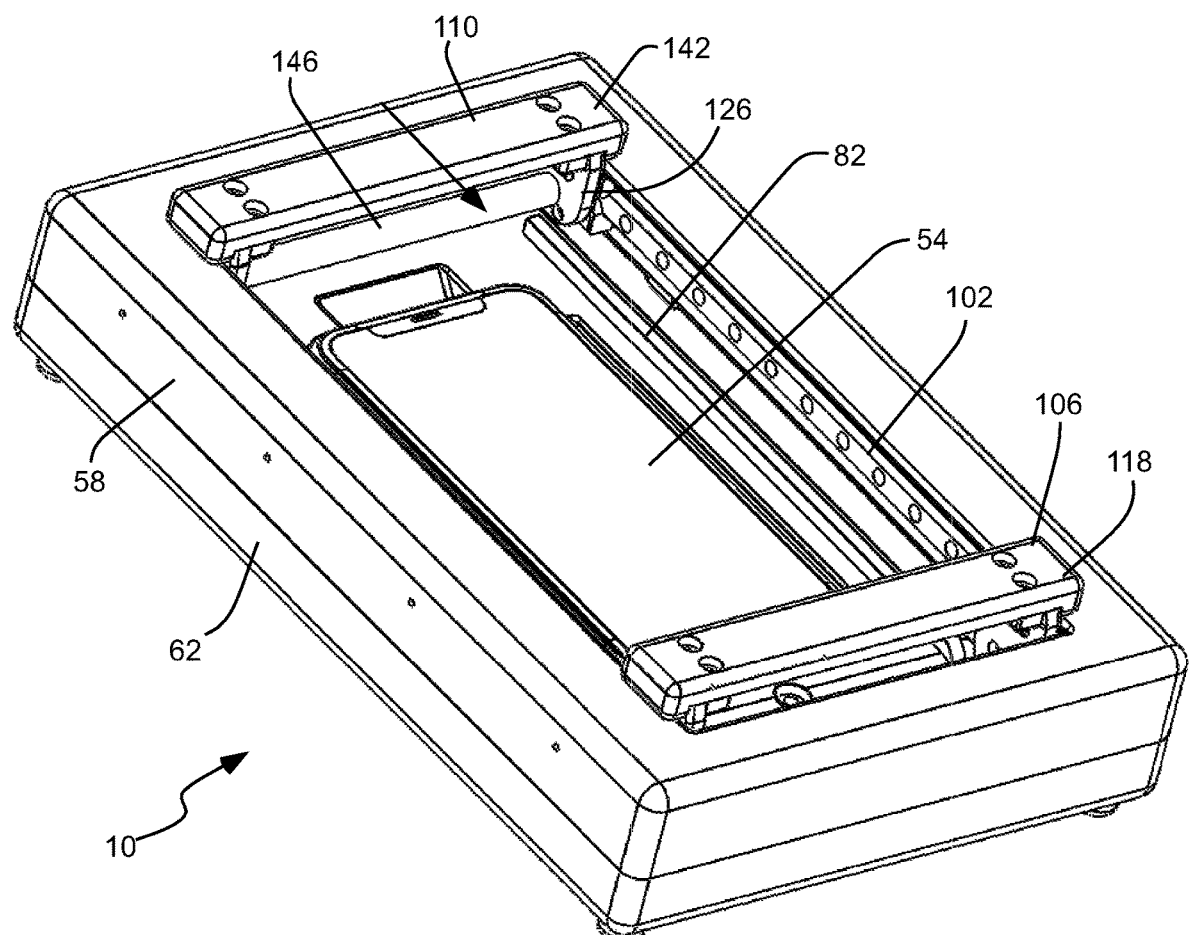
FIG. 8 is a perspective view of the screen protector installation machine of FIG. 1, shown with the lid in a closed position.
Figure 9:
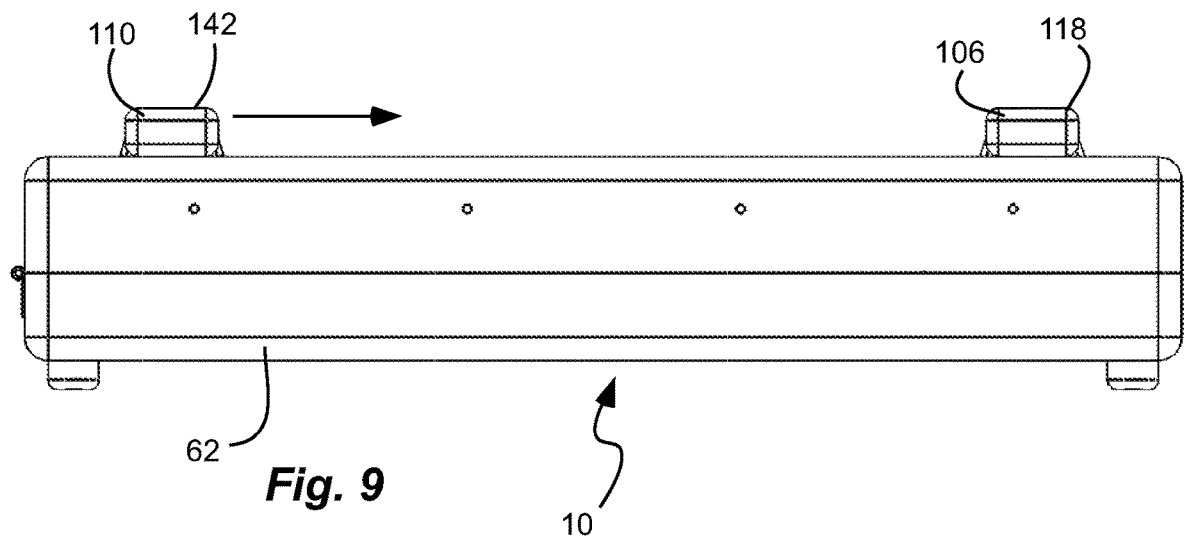
FIG. 9 is a side view of the screen protector installation machine of FIG. 1, shown with the lid in the closed position.
Figure 10:
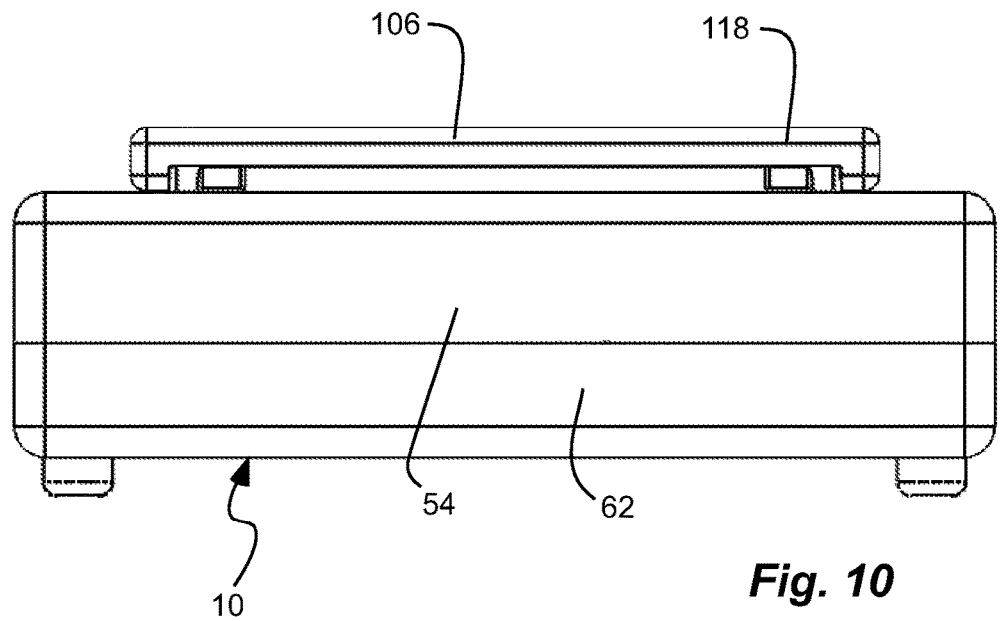
FIG. 10 is a front view of the screen protector installation machine of FIG. 1, shown with the lid in the closed position.
Figure 11:
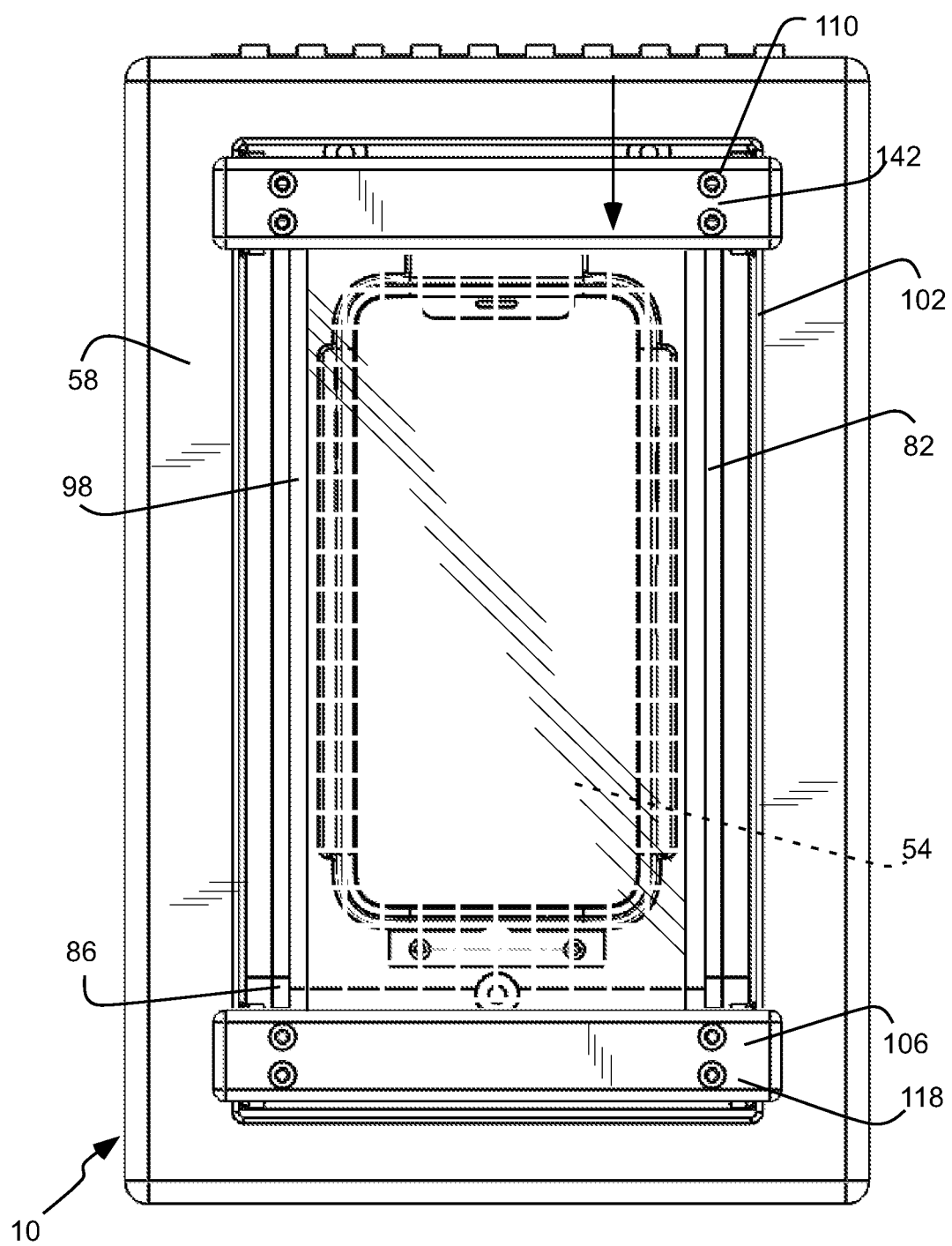
FIG. 11 is a top view of the screen protector installation machine of FIG. 1, shown with the lid in the closed position.

Referring to FIGS. 1-11, the screen protector installation machine 10 is shown in an exemplary embodiment. The machine 10, along with the screen protector laminate 14, can be used to install the screen protector 18 on a display screen of a mobile device, such as a cell phone 54. The machine 10 comprises a lid 58 coupled to a base 62 and closable over the base 62. In one aspect, the lid 58 can pivot with respect to the base 62 and can be pivotally coupled to the base 62. A hinge 66 can couple the lid 58 to the base 62 with the lid 58 pivoting about the hinge 66 between: 1) an open position with the lid 58 away from the base 62 (FIGS. 1-4); 2) a closed position with the lid 58 over and/or on the base 62 (FIGS. 8-11); and 3) an intermediate position with the lid 58 over and spaced-apart from the base 62 at an acute angle (FIGS. 5-7). Thus, the lid 58 and the base 62 can form a clam-shell that can open to receive a cell phone 54 and the screen protector laminate 14, and can close to align and apply the screen protector 18 to the cell phone 54.

The base 62 comprises an impression 70, such as a cavity, to receive and secure the cell phone 54. The impression 70 can have a perimeter of portions thereof that are contiguous with a perimeter or portions thereof of the cell phone 54 to hold and position the cell phone 54 in the base 62. In another aspect, the base 62 can comprise interchangeable blanks 74 selectively secured to the base 62. Each blank 74 can comprise an impression 70 to receive and secure a different cell phone. Thus, the base 62 can have a recess, such as a cavity, with posts received in bores of a selected blank 74. In one aspect, the base 62 and/or the blank 74 can comprise a pivotal connector 78 pivotally coupled to the base 62 or the blank 74 adjacent the impression 70, and having a protrusion inserted into a socket of the cell phone 54. The protrusion can mimic a plug adapted for the socket to further insure that the correct blank 74 is being used for the selected cell phone 54, and/or to further secure the cell phone 54 with respect to the base 62.

Furthermore, a pair of rails 82 can be carried by the base 62 and positioned on opposite sides of the impression 70 or cavity. In one aspect, the rails 82 can be formed on or with the blank 74. In another aspect, the rails 82 can be formed on or with the base 62. The rails 82 can extend longitudinally along the base 62 and along the length of the base 62, the impression 70, and the cell phone 54. The rails 82 can have a leading end near the hinge 66 and the lid 58 in the open position, and a trailing end 86 further from the hinge 66. The trailing end 86 of the rails can have a taper declining towards the base 62 and into or towards a cavity in the base 62.

The lid 58 is adapted to receive, carry and secure the screen protector laminate 14, and to align and position the screen protector 18 of the laminate 14 over the impression 70, and thus the screen of the cell phone 54. The lid 58 can have stumps 90 positioned on an inner surface of the lid 58. The stumps 90 can be positioned at proximal and distal ends of the lid 58, and can mate and correspond with the holes 50 of the laminate 14. The stumps 90 can be arranged in a stump pattern with the stumps at the proximal end being different from stumps in a stump pattern in the distal end. As described above, the stumps 90 and the holes 50 can be patterned to properly orient the laminate 14 on the lid 50. The holes 50 can be press-fit onto the stumps 90.

The lid 58 has an opening 94 therein positioned over the impression 70 and over the cell phone 54 in the closed position. The laminate 14 is positioned across the opening 94 and can extend the length of the opening 94. The stubs 90 can be positioned at a perimeter of the opening 94. Thus, the leading end of the web 22 can be coupled to the lid 58 at one end of a perimeter of the opening 94 and a trailing end of the web 22 can be coupled to the lid 58 at an opposite end of the perimeter of the opening 94. A pair of opposite side slots 98 are defined between the web 22 and opposite lateral sides of the opening 94.

The lid 58 can have a pair of tracks 102 carried by the lid 58 on opposite sides of the opening 94. The tracks 102 can face one another across the opening 94. A pair of sliders, namely a first slider 106 and a second slider 110, can be carried by the lid 58 and can slide back and forth along the pair of tracks 102. Unless otherwise specified, the terms "first" and "second" are used to distinguish the sliders from one another, and not to imply that two sliders are required. In one aspect, the tracks 102 can be channels and the sliders 106 and 110 can have carriages sliding in the channels. In another aspect, the tracks 102 can be rails and the sliders 106 and 110 can have carriages gripping the rails on opposite sides thereof. The first slider 106 can be slid from an initial position nearer the hinge 66 (defining the leading end of the laminate or web) to a subsequent position at the trailing end 86 of the pair of rails 82 (defining a trailing end of the laminate or web). In addition, the lid 58 can have a pair of racks 114 carried by the lid 58 and positioned on opposite sides of the opening 94. The racks 114 can be located on an underside of the lid.

The first slider 106 is carried by the lid 58 and slidable back and forth along the pair of tracks 102. The first slider 106 removes the backing layer 26 from the laminate 14. The first slider 106 comprises a first handle 118 located above the opening 94 to be grasped or engaged by a user, and slid across the opening 94. In addition, the first slider 106 comprise a spool 122 positioned below the first handle 118, below the opening 94 and below the lid 58. The first slider 106 and/or the first handle 118 has a pair of lateral spars 126 extending between the first handle 118 and the spool 122, and extending through the opposite side slots 98 between the laminate 14 and the sides of the opening 94. Thus, the first handle 118 can be coupled to the spool 122 through the pair of opposite side slots 98. The lateral spars 126 can be secured to the carriages engaging the tracks 102. In use, the laminate 14 can be positioned across the opening and between the opening 94 and the spool 122. Thus, the spool 122 is positioned below the laminate 14, and adjacent the backing layer 26.

The tab 30 of the backing layer 26 can be coupled to the spool 122 so that the baking layer 26 can be wound around the spool 122 as the spool 122 rotates and the first slider 106 slides. The spool 122 can have a slot 130 to receive tab 30, or the head 34 thereof. The slot 130 can have a width less than the trailing end 46 of the head 34, and the wider edge 46 of the enlarged head 34 can be wider than the slot 130. Thus, the head 34 compresses to pass through the slot 130, and expands when withdrawn from the other end of the slot 130, with the wider edge 46 abutting a perimeter of the slot 130 to retain the neck 38 of the tab 30 in the slot 130.

The machine 10 can comprise a rack and pinion type interface between the first slider 106 and the lid 58, and coupled to the spool 122 to rotate the spool 122 as the first slider 106 slides along the track 102. As described above, a pair of racks 114 can be carried on an underside of the lid 58. A pair of pinions 134, such as gears, can be coupled to the spool 122 and can engage the pair of racks 114 to rotate the spool 122 as the first slider 106 slides. In one aspect, the pinions 134 and the spool 122 can be co-axial and fixed with respect to one another. The spool 122 rotates and winds the backing layer 26 of the laminate 14 around the spool 122, and removes the backing layer 26 from the laminate 14 and the screen protector 18 as the first slider 106 slides from the initial position to the subsequent position. The spool 122 can be sized, such as with an outer diameter, to wind the backing layer 26 as the first slider 106 slides.

A pair of wheels 138, such as bearings or sliders, can be coupled to the first slider 106. Unless otherwise specified, the term "wheel" is used herein broadly to include bearing or sliders. In one aspect, the wheels 138 and the spool 122 can be co-axial. The wheels 138 can turn freely with respect to the spool 122 and the pinions 134 or gears. The wheels 138 ride on the pair of rails 82 of the base 62 when the lid 58 is in the intermediate position. The pair of wheels 138 abut to the pair of rails 82 in the intermediate position to resist the lid 58 from moving to the closed position, and to maintain the screen protector 18 off of the cell phone 54 until the backing layer 26 has been removed and the adhesive exposed. The pair of wheels 138 can follow the taper of the trailing end 86 of the pair of rails 82 to allow the lid 58 to move from the intermediate position to the closed position. Thus, the first slider 106 maintains the lid 58, and thus the screen protector 18, spaced-apart from the cell phone 54. While sliding, the first slider 106 removes the backing layer 26 from the screen protector 18 and the web 22, and automatically allows the lid to close under the force of gravity to automatically place the screen protector 18, such as the adhesive layer thereof, onto the screen of the cell phone 54.

As described above, the second slider 110 is carried by the lid 58 and is slidable back and forth along the pair of tracks 102. The second slider 110 comprises a second handle 142 positioned above the opening 94 and a roller 146 below the second handle 142, but above the laminate 14, the web 22 and the screen protector 18. The roller 146 is positioned adjacent and against the web 22 of the laminate 14 to abut to the web 22 of the laminate 14 and press the screen protector 18, and the adhesive layer thereof, against the cell phone 54 as the second slider 110 slides back and forth while the lid 58 is in the closed position. The roller 146 can have a width to match a width of the screen protector 18.

As described above, the holes 50 of the laminate 14 or the web 22 can be coupled to the stumps 90 positioned on the inner surface of the lid 58 to hold the web 14 and the screen protector 18 from moving with respect to the lid 58, the base 62, and the cell phone 54. The holes 50 can be press-fit onto the stumps 90. The stumps 90 and the holes 50 can be patterned so that only one position and orientation of the laminate 14 is possible to insure correct positioning and alignment of the screen protector 18 with respect to the cell phone 54. In addition, the base 62 or the blank 74 can have holes 150 corresponding to at least some of the stumps 90 to insure that correct blank 74 is being used, and/or to keep the web 22 on the lid 58.

A method for installing a screen protector 18 on a cell phone 54, and for using the machine 10 described above, comprises:

opening the lid 58 of the machine 10 and positioning the first and second sliders 106 and 110 to their initial positions nearer the hinge 66;

selecting a correct blank 74 with an impression 70 that matches the cell phone 54;

positioning the blank 74 on the base 62;

fitting the laminate 14 to the lid 58, which may comprise:
    threading the laminate 14 between the spool 122 and the first handle 118;
    fitting the holes 50 of the web 14 onto the stubs 90 of the lid 58;

inserting the tab 30 of the backing layer 26 into the slot 130 of the spool 122, which may comprise inserting the enlarged head 34 through the slot 130;

pivoting the lid 58 to the intermediate position with the wheels 138 against the rails 82;

sliding the first slider 106 from the initial position towards the subsequent position with the spool 122 rotating and winding the backing layer 26 around the spool 122 and exposing the screen protector 18 and adhesive layer thereof;

allowing the wheels 138 to follow the trailing end 86 of the rails 82 towards the base 62, and allowing the lid 58 to close with respect to the base 62, and allowing the exposed screen protector 18 and adhesive thereof to contact the cell phone 54; and sliding the second slider 110 from the initial position towards a subsequent position with the roller 146 pressing the web 22, and thus the screen protector 18 against the cell phone 54. The second slider 110 can be slid back and forth.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A screen protector installation machine configured to install a screen protector on a mobile device, the machine comprising:
  a base comprising an impression configured to receive and secure the mobile device;
  a lid coupled to the base and closable over the base;
  the lid having an open position, a closed position over the base, and an intermediate position over and spaced-apart from the base;
  an opening in the lid, the lid configured to carry a screen protector laminate across the opening and over the impression when the lid is in the closed position, the lid configured to receive and secure a web of the laminate carrying a screen protector and a backing with a tab;
  a pair of rails carried by the base on opposite sides of the impression and having a leading end and a trailing end, the trailing end declining towards the base;
  a pair of tracks carried by the lid on opposite sides of the opening;
  a first slider carried by the lid and slidable along the pair of tracks, and comprising a first handle and a spool, the spool having a slot configured to receive the tab of the screen protector laminate, the first slider sliding from an initial position to a subsequent position at the trailing end of the pair of rails;
  the spool being rotatable as the first slider slides configured to wind the backing of the laminate around the spool and remove the backing from the screen protector as the first slider slides from the initial position to the subsequent position;
  a pair of wheels coupled to the first slider and riding on the pair of rails of the base when the lid is in the intermediate position, the pair of wheels declining on the trailing end of the pair of rails to allow the lid to move from the intermediate position to the closed position; and
  a second slider carried by the lid and slidable back and forth along the pair of tracks, and comprising a second handle and a roller, the roller configured to abut to the web of the laminate and press the screen protector against the mobile device as the second slider slides back and forth while the lid is in the closed position.

2. The machine of claim 1, further comprising:
  the pair of wheels abut to the pair of rails in the intermediate position to resist the lid from moving to the closed position and configured to maintain the screen protector off of the mobile device until the backing layer has been removed.

3. The machine of claim 1 further in combination with the screen protector laminate, wherein:
  the laminate is disposed across the opening of the lid, and between the spool of the first slider and the opening;
  the web of the laminate is secured to the lid; and
  the tab of the backing layer of the laminate is received in a slot of the spool of the first slider.

4. The combination of claim 3, further comprising:
  the slot being narrower than an enlarged head of the tab, the enlarged head being on a narrower neck, the head having a narrower leading end and a wider trailing end with a wider edge adjacent the narrower neck.

5. The combination of claim 3, further comprising:
  stumps positioned on an inner surface of the lid at a perimeter of the opening and matching and mating with corresponding holes in the web of the screen protector laminate.

6. The machine of claim 1, further comprising:
a hinge coupling the lid to the base, the lid pivoting about the hinge between the open position, the intermediate position and the closed position.

7. The machine of claim 1, further comprising:
a rack and pinion type interface between the first slider and the lid, and comprising a pair of racks carried by the lid on opposite sides of the opening, and a pair of pinions coupled to the spool of the first slider and engaging the pair of racks to rotate the spool as the first slider slides in the pair of tracks.

8. A screen protector installation machine in combination with a screen protector laminate configured to apply a screen protector to a mobile device, the laminate comprising the screen protector carried by a web and a backing layer on the screen protector opposite the web, the machine comprising:
a base comprising an impression configured to receive and secure the mobile device;
a lid coupled to the base and closable over the base;
a first slider carried by the lid and comprising a spool rotatable with respect to the lid;
the laminate being carried by the lid and positioned between the lid and the spool, and with the spool between the laminate and the impression, during use;
the web being coupled to the lid and the backing layer coupled to the spool; and
the spool rotating to wind the backing layer around the spool as the first slider slides with respect to the lid to expose the screen protector.

9. The combination of claim 8, further comprising:
a slot in the spool receiving a tab of the backing layer of the laminate therein.

10. The combination of claim 9, further comprising:
an enlarged head of the tab on a narrower neck, the head having a narrower leading end and a wider trailing end with a wider edge adjacent the narrower neck; and
the wider edge of the enlarged head being wider than the slot of the spool.

11. The combination of claim 8, further comprising:
an opening in the lid and positionable over the impression and configured to be positioned over the mobile device in the impression; and
the laminate being positioned across the opening and between the opening and the spool.

12. The combination of claim 11, further comprising:
the web coupled to the lid at one end of a perimeter of the opening and at an opposite end of the perimeter of the opening.

13. The combination of claim 12, further comprising:
a pair of opposite side slots defined between the web and opposite lateral sides of the opening; and
the first slider having a first handle coupled to the spool through the pair of opposite side slots.

14. The combination of claim 8, further comprising:
the lid having an open position, a closed position over the base, and an intermediate position over and spaced-apart from the base;
a pair of rails carried by the base on opposite sides of the impression and having a leading end and a trailing end, the trailing end declining towards the base; and
a pair of wheels coupled to the first slider and riding on the pair of rails of the base when the lid is in the intermediate position, the pair of wheels declining on the trailing end of the pair of rails to allow the lid to move from the intermediate position to the closed position.

15. The combination of claim 14, further comprising:
the pair of wheels abutting to the pair of rails in the intermediate position to resist the lid from moving to the closed position and configured to maintain the screen protector off of the mobile device until the backing layer has been removed.

16. The combination of claim 8, further comprising:
a rack and pinion type interface between the first slider and the lid, and coupled to the spool to cause the spool to rotate as the first slider slides.

17. The combination of claim 16, wherein the rack and pinion type interface further comprises:
a pair of tracks carried by the lid; and
a pair of pinions coupled to the spool of the first slider and engaging the pair of racks to rotate the spool as the first slider slides with respect to the lid, the spool configured to rotate and wind the backing layer of the laminate around the spool and remove the backing layer from the laminate as the first slider slides.

18. The combination of claim 8, further comprising:
a pair of tracks carried by the lid; and
the first slider slidable along the pair of tracks.

19. The combination of claim 18, further comprising:
a second slider carried by the lid and slidable back and forth along the pair of tracks, and comprising a second handle and a roller, the roller configured to abut to the web of the laminate and press the screen protector against the mobile device as the second slider slides back and forth while the lid is in the closed position.

20. A screen protector installation machine configured to install a screen protector on a mobile device, the machine comprising:
a base comprising interchangeable blanks selectively secured to the base, each blank comprising an impression configured to receive and secure the mobile device;
a lid coupled to the base and closable over the base;
a hinge coupling the lid to the base, the lid pivoting about the hinge between an open position away from the base and a closed position over the base and an intermediate position over and spaced-apart from the base at an acute angle;
an opening in the lid;
the lid configured to carry a screen protector laminate across the opening and over the impression when the lid is in the closed position, the lid configured to receive and secure a web of the laminate carrying a screen protector and a backing, the backing having a tab with an enlarged head on a narrower neck, the head having a narrower leading end and a wider trailing end with a wider edge adjacent the narrower neck;
a pair of rails carried by the base on opposite sides of the impression and having a leading end near the hinge and a trailing end further from the hinge, the trailing end having a taper declining towards the base;
a pair of tracks carried by the lid on opposite sides of the opening;
a pair of racks carried by the lid on opposite sides of the opening;
a first slider carried by the lid and slidable back and forth along the pair of tracks, and comprising a first handle above the opening and a spool below the first handle, the spool having a slot configured to receive the head of the tab and having a width less than the trailing end of the head with the head compressing to pass through the slot and expanding when withdrawn from the slot with the wider edge abutting a perimeter of the slot to retain the neck of the tab in the slot, the first slider sliding from an initial position nearer the hinge to a subsequent position at the trailing end of the pair of rails;

a pair of pinions coupled to the spool of the first slider and engaging the pair of racks to rotate the spool as the first slider slides in the pair of tracks, the spool configured to rotate and wind the backing of the laminate around the spool and remove the backing layer from the laminate as the first slider slides from the initial position to the subsequent position;

a pair of wheels coupled to the first slider and riding on the pair of rails of the base when the lid is in the intermediate position, the pair of wheels following the taper of the trailing end of the pair of rails to allow the lid to move from the intermediate position to the closed position; and a second slider carried by the lid and slidable back and forth along the pair of tracks, and comprising a second handle above the opening and a roller below the second handle, the roller configured to abut to the web of the laminate and press the screen protector against the mobile device as the second slider slides back and forth while the lid is in the closed position.

21. The machine of claim 1, further comprising:

stumps positioned on an inner surface of the lid at a perimeter of the opening configured to match and mate with corresponding holes in the web of the screen protector laminate.

22. The machine of claim 1, further comprising:

holes in the base or the blanks corresponding to at least some of the stumps.

\* \* \* \* \*